United States Patent
Malacarne et al.

(10) Patent No.: US 7,456,743 B2
(45) Date of Patent: Nov. 25, 2008

(54) COMBINED LOW AND HIGH FREQUENCY RFID SYSTEM

(75) Inventors: Enrico Malacarne, Duebendorf (CH); Carlo Mutti, Origlio (CH); Christian Narvaez, Purasca (CH)

(73) Assignee: Datamars S.A. (CH)

( * ) Notice: Subject to any disclaimer, the term of this patent is extended or adjusted under 35 U.S.C. 154(b) by 124 days.

(21) Appl. No.: 11/295,812

(22) Filed: Dec. 7, 2005

(65) Prior Publication Data

US 2007/0132584 A1 Jun. 14, 2007

(51) Int. Cl.
*G08B 13/14* (2006.01)

(52) U.S. Cl. ............ 340/572.1; 340/572.4; 340/539.13; 340/10.1; 235/385

(58) Field of Classification Search ............... 340/572.4, 340/572.1, 539.13, 10.1, 10.2, 5.92, 825.49; 455/101, 133; 235/385; 705/28; 700/215, 700/225
See application file for complete search history.

(56) References Cited

U.S. PATENT DOCUMENTS

| | | | |
|---|---|---|---|
| 6,330,971 B1 * | 12/2001 | Mabry et al. | 235/383 |
| 6,674,365 B2 * | 1/2004 | Grabner | 340/572.5 |
| 6,804,262 B1 * | 10/2004 | Vogel et al. | 370/480 |
| 7,019,639 B2 * | 3/2006 | Stilp | 340/531 |
| 7,180,403 B2 * | 2/2007 | Quan | 340/10.3 |
| 2002/0175805 A9 * | 11/2002 | Armstrong et al. | 340/10.31 |
| 2003/0229486 A1 * | 12/2003 | Ito | 703/27 |
| 2005/0180465 A1 * | 8/2005 | Srinivasan et al. | 370/503 |
| 2005/0212673 A1 * | 9/2005 | Forster | 340/572.7 |
| 2005/0258966 A1 * | 11/2005 | Quan | 340/572.7 |
| 2006/0048108 A1 * | 3/2006 | Ushiku | 717/136 |
| 2007/0096876 A1 * | 5/2007 | Bridgelall et al. | 340/10.1 |

\* cited by examiner

*Primary Examiner*—George A Bugg
*Assistant Examiner*—Hoi C Lau
(74) *Attorney, Agent, or Firm*—Akerman Senterfitt

(57) ABSTRACT

A radio frequency identification (RFID) system is described, including a low frequency read-write device (1B) comprising an antenna (2B) connected to a transceiver (4B), for receiving/transmitting low RF waves from/to an RFID tag (5B), and a decoder (3B) for decoding said low RF waves into digital data (dig-B); an host computer (20) is intended to be connected to the low frequency read-write device (1B) for processing digital data (dig-B). The RFID system further includes a high frequency read-write device (1A), comprising an antenna (2A) connected to a transceiver (4A), for receiving/transmitting high RF waves from/to an RFID tag (5A), and a decoder (3A) for decoding said high RF waves into digital data (dig-A); the high frequency read-write device is connected to a low frequency read-write device (1B) and to an host computer (20) respectively through a driver connection (22) and an host connection (21). A bundle interface (ITF), receives digital data (dig-A, dig-B) through the driver connection (22) while a flow controller (SW) drives the flow of such digital data (dig-A, dig-B) through host connection (21) and towards the host computer (20).

18 Claims, 4 Drawing Sheets

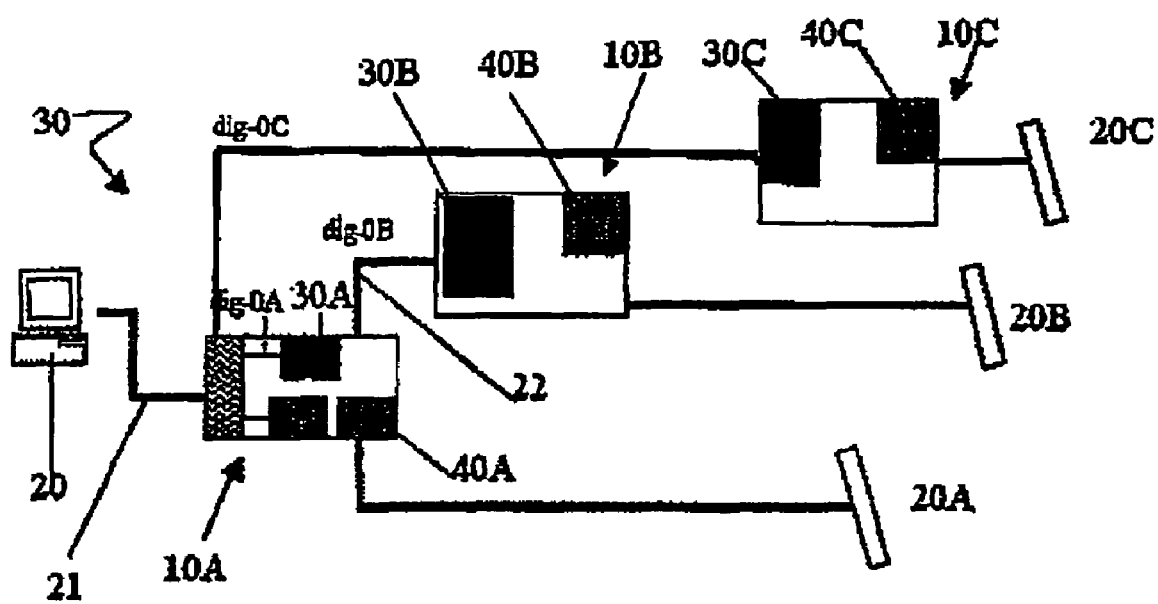

COMBINED LOW AND HIGH FREQUENCY RFID SYSTEM

FIELD OF APPLICATION

This invention relates to a radio frequency identification (RFID) system comprising a read-write device, including an antenna packaged with a decoder and a transceiver, for receiving and transmitting RF waves from and to an RFID tag including a microchip and a tag-antenna.

In particular this invention relates to an RFID system of the type indicated above that, transmitting RF waves through the read-write device, forms a magnetic field joining with the tag-antenna on the RFID tag and so powering the RFID tag microchip.

This invention relates to an RFID system complying with the standards specified, for example, by International Organization for Standardization (ISO) 18000-2 and ISO 18000-3.

PRIOR ART

As it is well known, an RFID system comprises a read-write device used for reading and writing data stored inside an RFID tag, generally embedded inside items or clothes in warehouses, shops, ID cards or laundries.

RFID tags are effective in manufacturing and other hostile environments where barcode labels may not survive. They are used in a wide range of markets including livestock identification and automated vehicle identification systems because of their ability to track also moving objects.

With reference to FIG. 1a, an RFID system is shown and globally indicated with 10 and comprises a read-write device 1A, including an antenna 2A, a decoder 3A and a transceiver 4A, for transmitting and receiving RF waves to and from an RFID tag 5A respectively. This RFID tag 5A includes a tag-antenna 7 and a microchip 6, provided of a memory unit 8 and storing item identification informations.

The RFID tag 5A needs to be powered to access its memory unit 8; more particularly the power is provided by the read-write device 1A that emits RF waves through the antenna 2A, forming a magnetic field that joins with the tag-antenna 7 on the RFID tag 5A.

When powered, the RFID tag 5A retrieves data stored inside its memory unit 8 and sends them back to the read-write device 1A, in the form of load modulation.

The read-write device 1A converts, through the decoder 3A, the received RF waves into digital data that are sent to a host computer 20 to be processed.

More particularly, the host computer 20 and the read-write device 1A are connected in a standard way, not explicitly shown in FIG. 1a because not relevant.

Generally, the air interface between the read-write device 1A and the corresponding RFID tags 5A is regulated by a standard. As instance, the air interface at 13.56 MHz is regulated by ISO 18000-3 that provides the physical layer requirements, the collision management system, protocol values and, in particular, defines the RF waves identification. However, other techniques can be used instead of the ISO standard.

Even if this type of RFID system is advantageous from various points of view, it has also known drawbacks which are particularly evident considering that some RFID systems are not conform to the standard ISO 18000-3. For example, the air interface at 134.2 KHz between the read-write device 1A and the corresponding RFID tags 5A is regulated by the standard ISO 18000-2 operating at a different frequency with respect to the air interface regulated by standard ISO 18000-3.

In general, as shown in FIGS. 1a and 1b, two different read-write device categories are used in the RFID system 10: high frequency read-write devices 1A and low frequency read-write devices 1B.

In particular frequency read-write devices 1A are generally conform to the standards ISO 18000-3 and are especially indicated for medium/high reading distances, up to 500 mm, and for high reading speed, approximately 30 items/sec in multi read mode.

On the contrary, low frequency read-write devices 1B provide different features like medium reading distance, up to 350 mm and a low reading speed, about 5 items/sec in multi read mode. The low frequency read-write devices 1B are generally conform to ISO standard 18000-2 and are particularly suitable for slow processing environments.

Actually some efforts are made to standardize all RFID tags to the standard ISO 18000-3 but, as a matter of fact, different RFID tags (with different protocols, coding schemes, . . . ) are still produced and used by different manufacturer in different countries, thus forcing to maintain high and low frequency read write devices and making difficult the identification process, even inside a same site.

For example, a laundry having different customers tagging their items with RFID tags 5A, 5B operating at different frequencies, should be structured with at least two read-write devices 1A and 1B operating at the corresponding frequencies.

This means that the laundry should be provided with two different systems, each having its own read-write device and its own network for connecting to a corresponding computerized RFID system thus increasing the plant and fixed cost of the enterprise.

A first aim of the present invention is that of providing an RFID system able to identify an RFID tag 5A, 5B independently from the specific RF for which it has been designed.

Another aim of the invention is that of providing an RFID system capable to respect both standards specified by the ISO 18000-2 and ISO 18000-3 and/or a non-ISO standard for RFID systems.

A further aim of the invention is to provide an RFID system overcoming in a simply and economical manner all the above-mentioned drawbacks connected to systems realized according to the prior art.

SUMMARY OF THE INVENTION

A first embodiment of the invention relates to an RFID system as previously indicated and defined by a low frequency RFID reader device comprising an antenna connected to a transceiver, for receiving/transmitting low RF waves from/to an RFID tag, and a decoder for decoding the low RF waves into digital data having a predetermined format; a host computer coupled to the low frequency RFID reader device for processing the digital data; and a high frequency RFID reader device, comprising an antenna connected to a transceiver, for receiving/transmitting high RF waves from/to an RFID tag, and a decoder for decoding said high RF waves into corresponding digital data. The high frequency RFID reader device is connected to said low frequency RFID reader device and to said host computer.

The features and advantages of the system according to the invention will be apparent from the following description of an embodiment thereof, given by way of non-limitative example with reference to the accompanying drawings.

BRIEF DESCRIPTION OF THE DRAWINGS

FIG. 7 is a schematic representation of an RFID system comprising a first, a second d a third read-write device, realized according to the present invention.

DETAILED DESCRIPTION

Figure 1A:
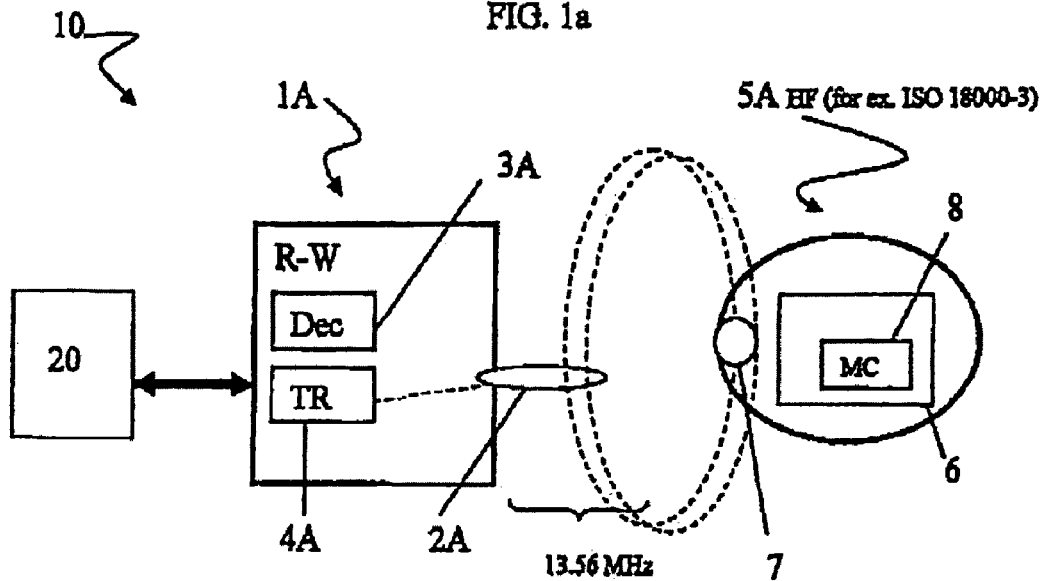
FIG. 1a is a schematic representation of an RFID system comprising a high frequency read-write device 1A and corresponding RFID tags 5A, realized according to the prior art.
Figure 1B:
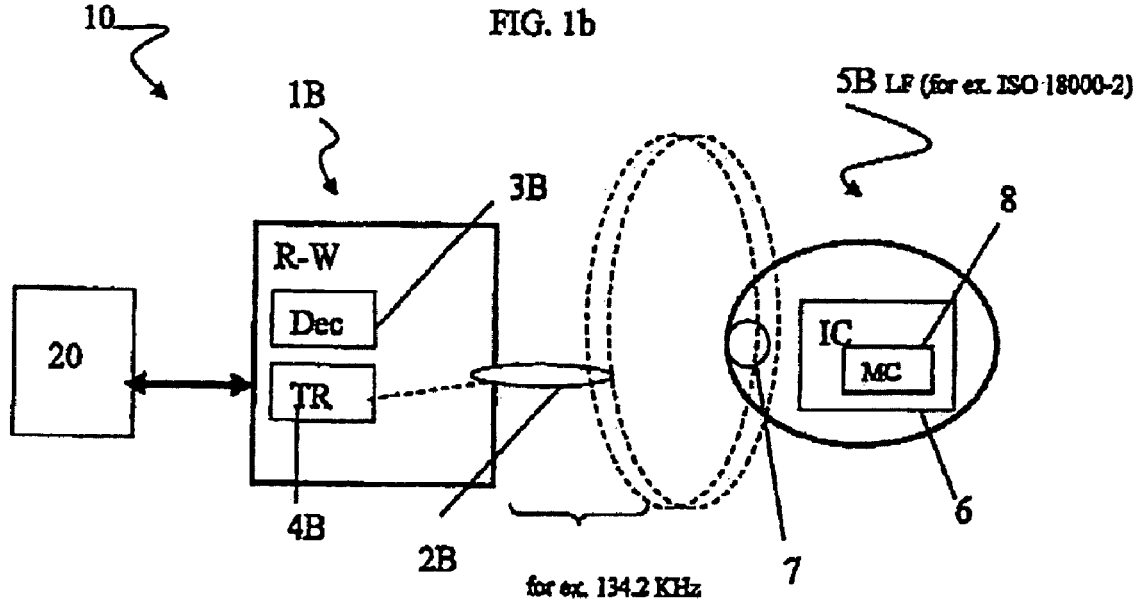
FIG. 1b is a schematic representation of an RFID system comprising a low frequency read-write device 1B and corresponding RFID tags 5B, realized according to the prior art.
Figure 2:
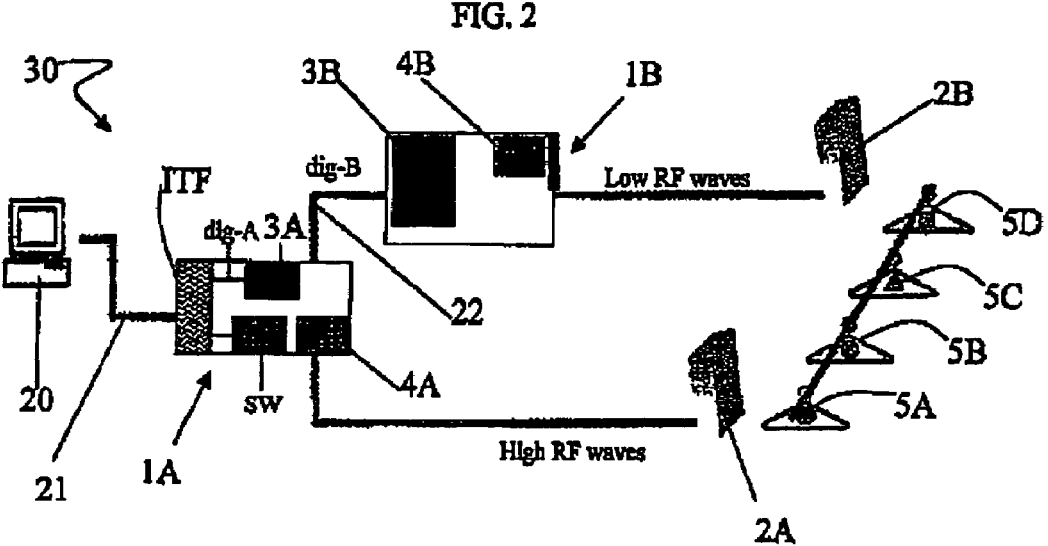
FIG. 2 is a schematic representation of an RFID system comprising a low and a high frequency read-write device, realized according to the present invention.

With reference to FIG. 2, an RFID system according to a first embodiment of the present invention will now be described and globally indicated with 30.

The RFID system 30 includes a low frequency read-write device 1B comprising an antenna 2B connected to a transceiver 4B, for receiving and transmitting low RF waves from and to an RFID tag 5B. The low frequency read-write device 1B also comprises a decoder 3B for decoding said low RF waves into digital data, dig-B.

The RFID system 30 also comprises a host computer 20 intended to be connected to the low frequency read-write device 1B for processing digital data dig-B.

According to the present invention, the RFID system 30 comprises a high frequency read-write device 1A, including an antenna 2A connected to a transceiver 4A, for receiving and transmitting high RF waves from and to an RFID tag 5A. The high frequency read-write device 1A also comprises a decoder 3A for decoding said high RF waves into digital data, dig-A.

Advantageously, the high frequency read-write device 1A is connected to the low frequency read-write device 1B and to the host computer 20, respectively through a driver connection 22 and a host connection 21.

More particularly, a bundle interface ITF, receives both digital data dig-A and dig-B, through said driver connection 22 and directly from the decoder 3A of the high frequency read-write device 1A. The data flow of digital data dig-A and dig-B, inside the bundle interface ITF, is controlled by a flow controller SW, driving their flow through said host connection 21, towards the host computer 20.

Advantageously, low RF waves entering the low frequency read-write device 1B, are decoded in digital data dig-B by decoder 3B and are forwarded to the high frequency read-write device 1A through the driver connection 22. On the contrary, high RF waves, directly entering the high frequency read-write device 1A; are decoded in digital data dig-A by decoder 3A.

More particularly, high RF waves are received by the antenna 2A of the high frequency read-write device 1A and are decoded by decoder 3A in digital data dig-A. Low RF waves instead, are received by the antenna 2B, enter the low frequency read-write device 1B wherein they are decoded by decoder 3B in digital data dig-B and finally forwarded to the high frequency read-write device 1A, trough driver connection 22.

Digital data dig-A and/or dig-B, having entered the high frequency read-write device 1A directly through the antenna 2A or indirectly through the low frequency read-write device 1B, are passed inside the bundle interface ITF.

Advantageously, the flow controller SW manages the processing and the flow of digital data dig-A and dig-B from such interface ITF to the host computer 20. The flow controller SW controls data flow towards the host computer 20, depending on their source: directly from the antenna 2A or from such low frequency read-write device 1B.

Advantageously, the RFID system according to the present invention, requires only an host connection 21 between the high frequency read-write device 1A and the host computer 20 so allowing such host 20 to process both low and high RFID tag 5A and 5B, being the high and low frequency read-write device interconnected through driver connection 22.

More particularly, the bundle interface ITF is included inside the high frequency read-write device 1A and receives digital data dig-A directly from said decoder 3A, digital data dig-B from the low frequency read-write device 1B, through said driver connection 22.

As a man skilled in the art may appreciate, according to the principles of the invention an ultra high frequency (UHF) read-write device may be employed in the RFID system 30 instead of the high frequency read-write device 1A. The low frequency read-write device 1B may in fact be connected to the UHF read-write device more or less as disclosed with reference to connection with the high frequency read-write device 1A, being the remaining part of the RFID system 30 substantially not altered.

In the same way, a very high frequency (VHF) read-write device may be employed in the RFID system 30 instead of the high frequency read-write device 1A.

Also in this case, the low frequency read-write device 1B may in fact be connected to the VHF read-write device more or less as disclosed with reference to connection with the high frequency read-write device 1A, being the part of the RFID system 30 substantially not altered.

According to a further embodiment of the present invention the bundle interface ITF and/or the flow controller SW are not included inside the high frequency read-write device 1A but, for example, inside or associated to the host computer 20 or in a dedicated electronic device used to interface the high frequency read-write device 1A and the host computer 20.

Advantageously according to another variant of the present invention, both antennas 2A, 2B of the high and low frequency read-write device 1A, 1B are merged in a single combined or combo antenna 2AB.

The combo antenna 2AB receives in an alternated way high and low RF waves from a plurality of RFID tags 5A-5D. High RF waves coming from RFID tags and for example conform to the ISO 18000-3 standard, are directly forwarded to the high frequency read-write device 1A wherein they are decoded through decoder 3A and finally passed to the bundle interface ITF in digital data dig-A.

On the contrary, low RF waves received by the combo antenna 2AB and coming from RFID tags for example conform to 18000-2, are previously forwarded to the low frequency read-write device 1B. Herein, low RF waves are decoded through decoder 3B and then passed, through driver connection 22, to the high frequency read-write device 1A in digital data dig-B. When entered the high frequency read-write device 1A, digital data dig-B are then passed to the bundle interface ITF.

Figure 3:
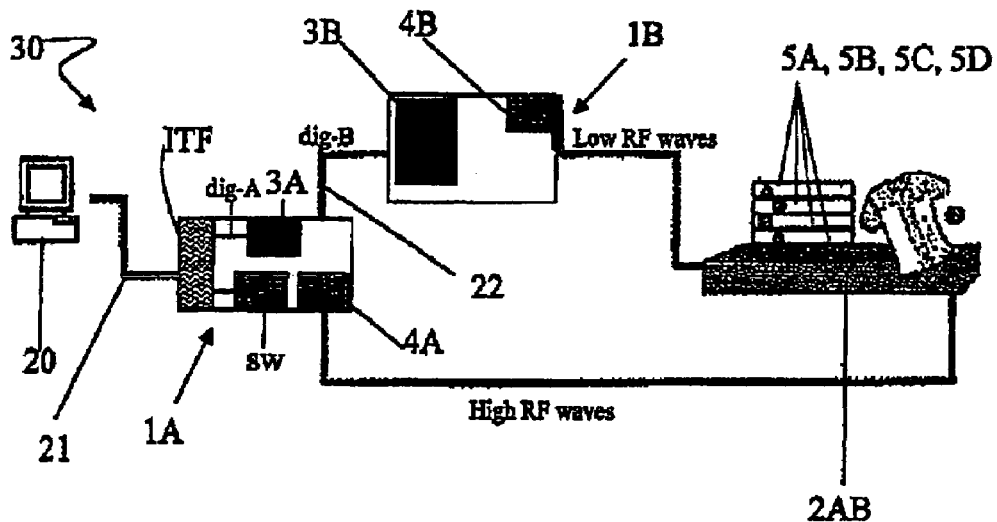
FIG. 3 is a schematic representation of a low and a high frequency read-write device realized according to a variant of present invention.

FIG. 3 schematically represents high and low frequency read-write devices 1A and 1B sharing with a combo antenna 2AB. More particularly, when the combo antenna receives low RF waves, forwards them to the low frequency read-write device 1B, when receives high RF waves forwards them to the high frequency read-write device 1A. The combo antenna 2AB is sensible to both low and high radio frequencies and provides the detected analog signal to the respective low and high read-write devices 1A and 1B.

Figure 5:
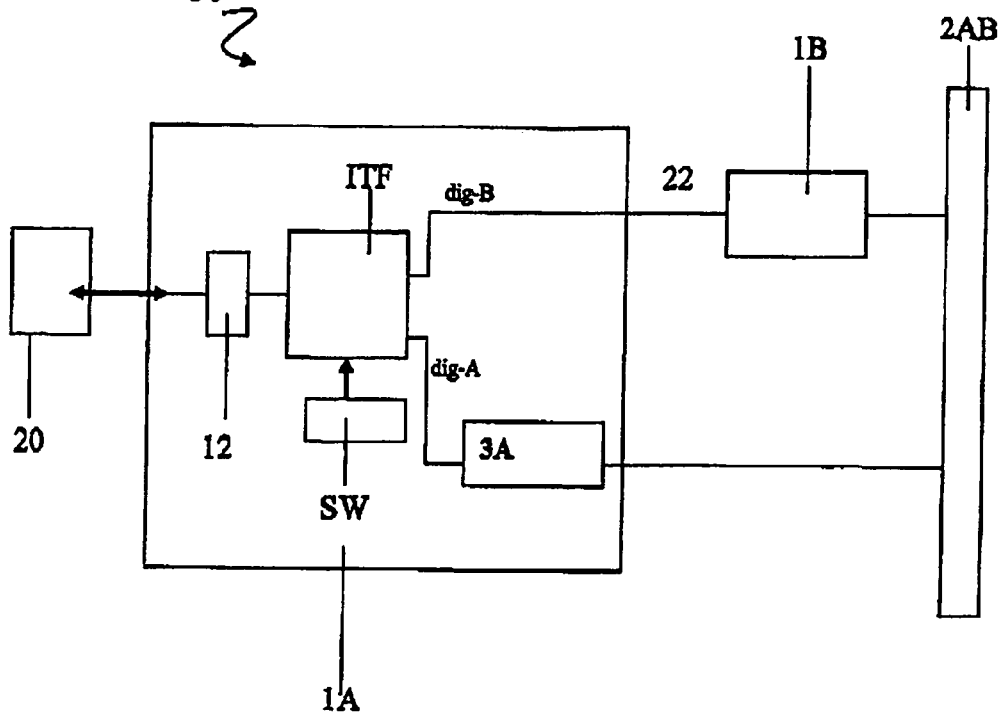
FIG. 5 is a more detailed schematic view of an RFID system and the corresponding connection to a host computer, realized according to the present invention.

As shown in FIG. 5, the combo antenna 2AB is connected to both low and high frequency read-write devices 1A and 1B. The sensible portion of the combo antenna 2AB must be located to a suitable distance from the RFID tags 5A, 5B.

The bundle interface ITF, included in said high frequency Read-write device 1A, provides a direct interface between it and the combo antenna 2AB, and a driver connection 22 between the low and high frequency read-write device.

More particularly, the flow controller SW provides for a regulated flow of data towards a buffer block 12 depending on their provenience: directly from the combo antenna 2AB or from such low frequency read-write device 1B.

Data are forwarded from the buffer block 12 and delivered to the host computer 20 for processing.

Advantageously, according to the invention, a code conversion is provided for converting and compressing the hexadecimal ASCII code detected through the high frequency read-write device 1A into a converted code that may be stored and processed into an host device 20 normally using and working only with codes obtained through low frequency read-write devices 1B.

The flow controller SW incorporated into the RFID system 30 provides this conversion.

This feature of the RFID system 30 of the invention is very important rendering the combo antenna 2AB truly compatible with host computers 20 already installed in laundries working on with low frequency read-write devices 1B.

Those computers are structured and set up to operate just with data and information available in a predetermined format and the two bytes dimension of the high frequency coding might be a problem for handling both low and high frequency information.

The code conversion provided in the flow controller SW allows the host computer 20 to handle also codes received through the high frequency read-write device 1A.

As may be appreciated from the example of FIG. 3, the low frequency read-write device 1B may be installed in an upstream position with respect to the high frequency read-write device 1A.

Furthermore, the RFID systems 30 allows to connect the low frequency read-write device 1B to the high frequency read-write device 1A in a cascade fashion so that only a plug-in driver connection 22 between the high frequency read-write device 1A and the host computer 20 may be required.

The digital data dig-B, extracted from low frequency waves, is passed in this way also through the high frequency read-write device 1A that is more configurable respect common low frequency read-write device 1B and is provided with a better and opener interface toward the host computer 20.

Advantageously, the combo antenna 2AB receives RF waves coming from different kind of RFID tags 5A-5D. In fact, even if in this fix of application the direction is to standardize RFID tags to high frequency, the combo antenna 2AB allows low frequency RFID tags and high frequency one to coexist, also preserving the possibility to use the hardware of low frequency read-write device 1B.

The above description concerning the combination of read-write devices is not limited to other possible configurations. For example, it could be possible to have the low frequency read-write device 1B working as a master and the h frequency read-write device 1A working as a slave.

A skilled man may also consider that the RFID system 30 may substantially be organized in the following dual structure: the low frequency read-write device 1B is directly connected to the host computer 20 and down-stream connected to the high frequency read-write device 1A, so that only a host connection 22 between the low frequency read-write device 1B and the host computer 20 is required.

The skilled man may also comprise that the RFID system 30 according to the present invention, more generally comprises a first read-write device 10B operating at a first predetermined frequency and a second read-write device 10A operating at a second predetermined frequency.

Figure 6:
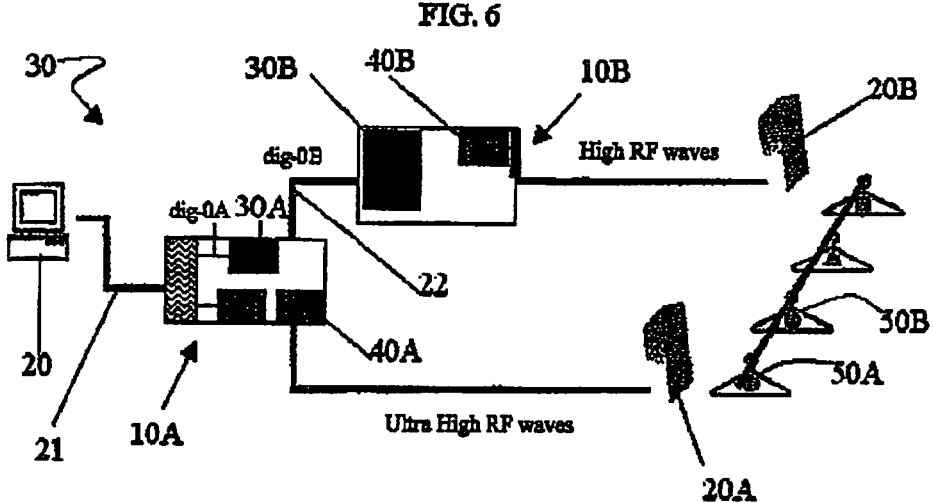
FIG. 6 is a schematic representation of a first and a second read-write device, operating respectively at a first and a second predetermined frequency, realized according to the present invention.

As schematically shown in FIG. 6, the first read-write device 10B comprises an antenna 20B connected to a transceiver 40B, for receiving and transmitting first predetermined RF waves from and to an RFID tag 50B. The first read-write device 10B also comprises a decoder 30B for decoding said first predetermined RF waves into digital data, dig-0B.

The second read-write device 10A includes an antenna 20A connected to a transceiver 40A, for receiving and transmitting second RF waves from and to an RFID tag 50A. The second read-write device 10A also comprises a decoder 30A for decoding aid second RF waves into digital data, dig-0A.

The second read-write device 10A is connected to the first read-write device 10B and to the host computer 20, respectively through the driver connection 22 and the host connection 21.

For example, the first read-write device 10B operates at high frequency and the second read-write device 10A, connected to the host computer 20 and to the first read-write device 10B respectively through the host connection 21 and the driver connection 22, operates at ultra high frequency.

Advantageously, a third read-write device 10C operating at a third predetermined frequency may be connected to the second read-write device 10A, as schematically shown in FIG. 7. The third read-write device 10C includes an antenna 20C connected to a transceiver 40C, for receiving and transmitting third RF waves from and to an RFID tag 50C. The third read-write device 10C also comprises a decoder 30C for decoding said third RF waves into digital data, dig-0C. For example, the third read-write device 1C operates at low frequency.

Figure 4:
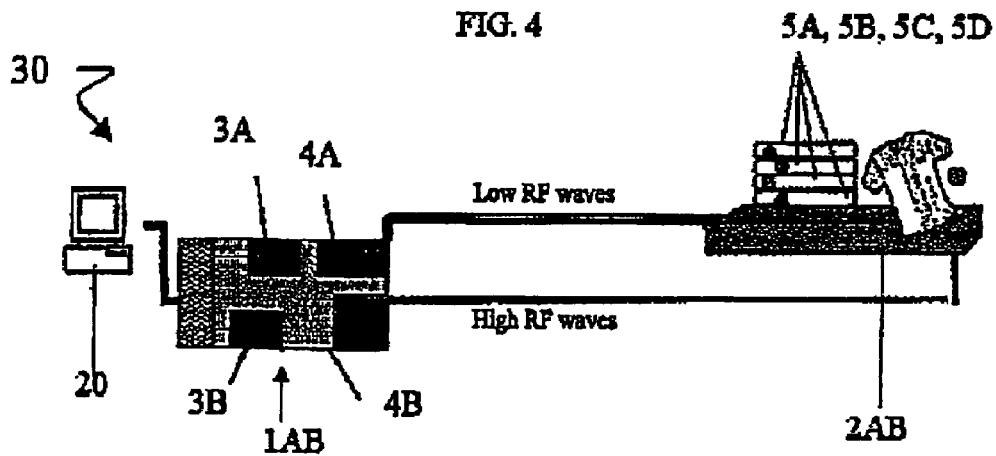
FIG. 4 is a schematic representation of a low and a high frequency read-write device realized according to another variant of present invention.

According to another aspect of the present invention, that may be defined as in the example of FIG. 4, the high frequency read-write device 1A and the low frequency read-write device 1B may be combined in a combo read-write device 1AB, provided with the combo antenna 2AB and directly connected to the host computer 20.

In this case the read-write device 1AB comprises a dual band transceiver 4A, 4B able to receive and transmit, through the antenna 2AB, low and high frequency-waves from and to different RFID tags 5A-5D.

The combo antenna 2AB of the present invention, advantageously allows the identification of different RFID tags with the use of a single or pre-installed computer network including the host computer 20.

Therefore, the system according to the invention may preserve the large part of the investments made by laundries capable to handle RFID tags working at low frequency allowing such laundries to migrate toward the most modern high frequency RFID tags technology just acquiring the system of the invention but not changing the other components of the identification plant.

The invention claimed is:

1. A radio frequency identification (RFID) system including:
   a low frequency RFID reader device comprising a first antenna connected to a first transceiver, for receiving/transmitting low RF waves from/to an RFID tag, and a first decoder for decoding said low RF waves into digital data having a predetermined format;
   a host computer coupled to said low frequency RFID reader device for processing said digital data; and
   a high frequency-RFID reader device,
   wherein the high frequency RFID reader device comprises a second antenna connected to a second transceiver, for receiving/transmitting high frequency RF waves from/to an RFID tag, and to a second decoder for decoding said high frequency RF waves into corresponding digital data, and
   wherein said high frequency RFID reader device is connected to said low frequency RFID reader device and to said host computer and comprises a flow controller for converting the digital data from said high frequency RFID reader device into said predetermined format and delivering the digital data from said high and low frequency RFID reader devices to said host computer.

2. The radio frequency identification (RFID) system according to claim 1, wherein said high frequency RFID reader device is connected to said low frequency RFID reader device and to said host computer respectively through a driver connection and a host connection.

3. The radio frequency identification (RFID) system according to claim 2, wherein a bundle interface receives said corresponding digital data directly from said second decoder and receives said digital data from said driver connection.

4. The radio frequency identification (RFID) system according to claim 3, wherein said bundle interface is in said high frequency RFID reader device.

5. The radio frequency identification (RFID) system according to claim 3, wherein said bundle interface is incorporated in additional electronic device providing said driver connection between said high frequency RFID reader device and said low frequency RFID reader device.

6. The radio frequency identification (RFID) system according to claim 3, wherein said bundle interface is in said host computer.

7. The radio frequency identification (RFID) system according to claim 3, wherein said flow controller drives, inside said bundle interface, the flow of said digital data towards said host computer.

8. The radio frequency identification (RFID) system according to claim 7, wherein inside said flow controller a code conversion is provided for converting and compressing the hexadecimal ASCII code detected through the high frequency RFID reader device into a converted code to be stored and processed into said host device.

9. The radio frequency identification (RFID) system according to claim 8, wherein said flow controller is provided for regulating the flow of said converted code to said host computer through a buffer block.

10. The radio frequency identification (RFID) system according to claim 9, wherein said buffer block temporarily stores said converted code before forwarding them in said host connection.

11. The radio frequency identification (RFID) system according to claim 1, wherein said second antenna of said high frequency RFID reader device and said first antenna of said low frequency RFID reader device are merged in a single combo antenna.

12. The radio frequency identification (RFID) system according to claim 11, wherein said combo antenna is sensible to low and high frequencies.

13. The radio frequency identification (RFID) system according to claim 11, wherein said low frequency RFID reader device and said high frequency RFID reader device are incorporated in a single combined RFID reader device.

14. The radio frequency identification (RFID) system according to claim 1, wherein said low frequency RFID reader device is upstream connected to said high frequency RFID reader device from the combo antenna to said host computer.

15. The radio frequency identification (RFID) system according to claim 1, wherein said low and high frequencies RFID reader devices are compatible with standards ISO 18000-2 and 18000-3, respectively.

16. The radio frequency identification (RFID) system according to claim 1, wherein said high frequency RFID reader device is upstream connected to said low frequency RFID reader device from the combo antenna to said host computer.

17. A radio frequency identification (RFID) system including:
   a first RFID reader device operating at a first predetermined frequency comprising a first antenna connected to a first transceiver, for receiving/transmitting first RF waves from/to an RFID tag, and a first decoder for decoding said first RF waves into digital data having a predetermined format;
   a host computer coupled to said first RFID reader device for processing said digital data;
   a second RFID reader device operating at a second predetermined frequency, comprising a second antenna connected to a second transceiver, for receiving/transmitting second RF waves from/to an RFID tag, and to a second decoder for decoding said second RF waves into corresponding digital data;
   said second RFID reader device being connected to said first RFID reader device and to said host computer and comprising a flow controller for converting the digital data from said second RFID reader device into said predetermined format and delivering the digital data from said first and second frequency RFID reader devices to said host computer.

18. The radio frequency identification (RFID) system according to claim 17, wherein a third RFID reader device operating at a third predetermined frequency is connected to said second RFID reader device.

\* \* \* \* \*